United States Patent
De Vaan

(10) Patent No.: US 7,976,164 B2
(45) Date of Patent: Jul. 12, 2011

(54) REAR PROJECTOR AND REAR PROJECTING METHOD

(75) Inventor: Adrianus Johannes Stephanus Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 423 days.

(21) Appl. No.: 12/158,702

(22) PCT Filed: Dec. 20, 2006

(86) PCT No.: PCT/IB2006/054970
§ 371 (c)(1),
(2), (4) Date: Jun. 23, 2008

(87) PCT Pub. No.: WO2007/072439
PCT Pub. Date: Jun. 28, 2007

(65) Prior Publication Data
US 2008/0304014 A1    Dec. 11, 2008

(30) Foreign Application Priority Data
Dec. 23, 2005 (EP) ................................ 05112962

(51) Int. Cl.
*G03B 27/26* (2006.01)
*G03B 21/14* (2006.01)
(52) U.S. Cl. .............................. 353/7; 348/51
(58) Field of Classification Search ............... 353/7, 8; 359/464, 465; 348/52, 56, 57, 51
See application file for complete search history.

(56) References Cited

U.S. PATENT DOCUMENTS

| | | | |
|---|---|---|---|
| 4,872,750 A | 10/1989 | Morishita | |
| 6,239,424 B1 * | 5/2001 | Kuo | 250/221 |
| 6,449,090 B1 * | 9/2002 | Omar et al. | 359/465 |
| 6,593,994 B2 | 7/2003 | Son et al. | |
| 6,843,564 B2 | 1/2005 | Putilin et al. | |
| 6,853,493 B2 * | 2/2005 | Kreitzer | 359/651 |
| 6,932,476 B2 | 8/2005 | Sudo et al. | |
| 2008/0068856 A1 * | 3/2008 | Schug et al. | 362/545 |

FOREIGN PATENT DOCUMENTS

| | | |
|---|---|---|
| EP | 1510857 A1 | 3/2005 |
| EP | 1511328 A2 | 3/2005 |
| JP | 61012197 | 1/1986 |
| JP | 2002258215 | 9/2002 |
| JP | 2005123664 | 5/2005 |
| WO | 9222989 A1 | 12/1992 |
| WO | 9843441 A1 | 10/1998 |

* cited by examiner

*Primary Examiner* — Tony Ko
(74) *Attorney, Agent, or Firm* — Larry Liberchuk

(57) ABSTRACT

The application relates to a rear projector and a rear projection method. There is provided at least one projection screen, at least two beamers, each of the at least two beamers generating one view of a scene into at least one viewing direction and projecting the view onto the rear side of the projection screen, at least one switchable diffuser which is switchable between a transparent state and a diffuse state, wherein in the transparent state each beamer generates a different view of a scene, and wherein in the diffuse state the beamers generate one view of a scene.

13 Claims, 6 Drawing Sheets

REAR PROJECTOR AND REAR PROJECTING METHOD

Figure 1:
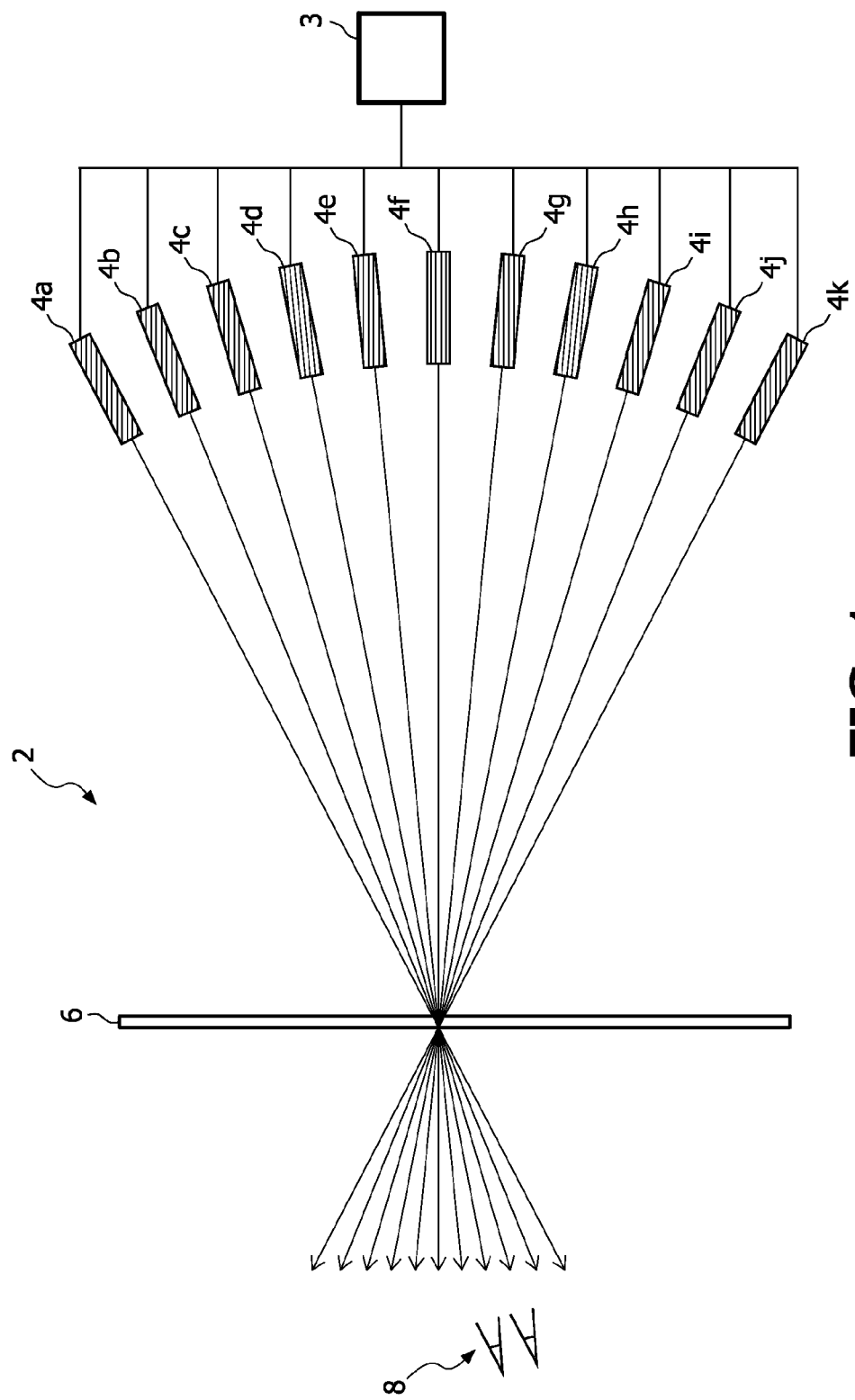

The present application relates in general to a rear projector and a rear projecting method.

Multi-view displays, such as 3-dimensional (3-D) view displays, are known in the art. These systems can be provided using rear projectors or front projectors as well as direct view Liquid Crystal Display (LCD) panels. These direct view liquid crystal display panels have a lenticular lens structure in front of the LCDs. The lenticular lens structure is arranged to group a number of LCD pixels, which emit light intended for a certain view into a corresponding viewing direction. The number of viewing directions accounts for the number of different views of a scene. Depending on the viewing position of an observer, each eye of the observer receives light of a different view, providing a 3-D effect. However, within these LCD systems the possible resolution for the views is limited. A LCD panel with M pixel elements and N different views can only provide a resolution of M/N pixels per view. This results in a reduced resolution for each of the views the larger the number of views becomes.

A drawback of such a 3D display system is that the viewer will only have a satisfying image performance at a rather limited viewing area. The eyes of the observer need to be located at an area, where each eye receives light from a view that is intended for that eye. When the observer is too close to the screen, the views overlap and both eyes will receive light intended for several viewing directions resulting to a very fussy image. When the observer is too far from the screen, both his eyes will receive the light from only one view and he will observe a 2D image, however when the observer will move his head, one of his eyes might move into a dark zone or even move into another view, what result into beating effects when the viewer slightly moves his head.

Another possibility to create multi-view displays is a rear projecting system. Such a system is, for instance, known from European patent application EP 1 511 328 A2. By means of a plurality of video processing devices, so called beamers, multiple views of a scene may be created. Several of these 3D projection systems have been build for professional applications. The beamers used in these systems are similar with known front projection beamers. These type of beamers make use of a small microdisplay that is magnified and imaged by a projection lens. To generate a bright image, such beamers contain a gas discharge lamp to illuminate the microdisplay. These beamers contain a complex optical system, to image the microdisplay and guide the light from the gas discharge projection lamp in an optimal way towards the projection screen. Typically, this optical system is designed such that the arc of the projection lamp is imaged in the projection lens. For this reason, the required size of the projection lens is proportional to the size of the arc. The developments of these projection lamps have lead to an optimized lamp for such beamers. Almost all microdisplay projection systems use today a high-pressure mercury gas discharge lamp having an arc distance of approximately 1.0 mm.

This arc distance has been found an optimum where a short arc gap is maintained over a relatively long lifetime of the lamp. It is an optimum of thermal management within the lamp, voltage drops around the electrodes and electrical power pumped into the gas discharge. Typically, this optimum is achieved at a lamp power of around 70 Watt.

The achieved lifetime is approximately 10,000 hours, and is sufficient for professional applications. Consumer television however demands a lifetime of 20,000 hours and that is why the microdisplay rear projection systems sold on the market today contain a replaceable projection lamp.

Current multiview consumer television contains a large number of these projection systems providing a number of technical and cost drawbacks. A 3D rear projection system containing 9 of such projectors consumes 630 Watt of electrical power and requires 9 lamp replacements over its lifetime, which is very cost intensive. Using lamps of a lower lamp power would result in shorter lifetimes and would require even more lamp-replacements.

Another problem is the light output and thermal management of known systems. Typically, a 2D microdisplay projection system containing a 70 Watt lamp will produce around 300 lumen of light. Using 9 of these projectors for multiview display would result in 2700 lumen, which would change the living room into a very bright illuminated room not being convenient to watch television. A possible solution would be to absorb a large part of this light within the individual beamers, however, this would even increase the tremendous amount of heat that already needs to be removed from of the system.

Another drawback is that the known microdisplay projection systems containing a gas discharge lamps are relatively expensive. Building a rear projection system containing many of such projectors would become unaffordable for most of the consumer buyers.

Therefore it is an object of the patent application to provide a rear projector providing a large number of 3D views at low cost and low complexity. It is an object of the application to provide a low cost, affordable system. Another object is to increase the lifetime of 3D multiview displays. A further object of the application is to provide a 3D multiview display with a high resolution in each view. A further object is to provide a display which is switcheable between a 3D mode and a 2D mode, such that next to the 3D option also a 2D image can be generated for all viewing locations in a room.

These and other objects are solved by a rear projector comprising at least one projection screen, at least two beamers, each of the at least two beamers generating one view of a scene into at least one viewing direction and projecting the view onto the rear side of the projection screen, at least one switcheable diffuser which is switcheable between a transparent state and a diffuse state, wherein in the transparent state each beamer generates a different view of a scene, and wherein in the diffuse state the beamers generate one view of a scene.

In the diffuse state the rear projector provides a 2D view, and in case of the transparent state the rear projector provides a 3D multiview. In case of 2D views, each beamer contributes to the overall resolution of the view. Thus, the resolution can be higher than with one single beamer. In addition, each beamer contributes to the resolution of its corresponding view in 3D multiview mode, and thus creating a high resolution view in 3D mode. Creating the views using the beamers according to the application provides for full resolution in each of the viewing cone, in case of multiple views and high resolution of a 2D image of a scene.

To create a rear projector, which can change between multiple-view 3D mode and single view 2D mode, the application provides at least one switcheable diffuser. The diffuser may be switched between a transparent state and a diffuse state, according to embodiments. In the transparent state, the light emitted from each of the beamers passes with a low diffusion through the projection screen. Thus, the light is directed into the intended viewing direction. In the diffuse state, the light emitted from each of the beamers is scattered at the diffuser. When scattered, the light propagates in all directions. There is only one view, which can be seen from any viewing direction in front of the screen and within large range of viewing areas. In this case, not one particular viewing cone is present in front of the diffuser, but each of the beamers contributes light to the same image. By switching the diffuser state, it is possible to change from a 3D multi-view display to a 2D single view display that can be observed from a very wide viewing area.

Embodiments provide a rear projector comprising at least one projection screen, and at least two beamers, each of the at least two beamers generating one view of a scene into at least one viewing direction and projecting the view onto the rear side of the projection screen, wherein the at least two beamers are scanning laser beamers, each of the at least two beamers generating the view of a scene by scanning the projection screen with its light beam; and further comprising at least one control device, wherein the control device is arranged to control the scanning laser beamers such that the light beams generated from the beamers are out of phase. This embodiment comprises already another independent inventive solution. The solution of this embodiment can be provided without the features of claim 1. The features of the dependent claims can be incorporated without the need of a switcheable diffuser.

Such type of rear projectors, and in particular scanning laser beamers may be used in mobile display products such as mobile phones, palmtop computers, MP3 players, MP4 players and more.

Scanning laser beamers may comprise one or more individual laser sources, an optical subsystem to combine these lasers sources into a single beam, a microscanner to scan the laser beam over a surface and a control device to control the scanner and simultaneously control the light output of each laser sources. Laser beamers according to the application can be extremely miniaturized. Sizes with a form factor of a cap of a pencil are possible. Further the beamers used to build such projectors have extremely long life times, meaning that no light sources needs to be replaced during the life of a consumer TV product.

In case a limited number of such beamers are applied, the light output of each laser beamer becomes relatively high with respect to laser safety. In case that many laser beamers are used, the alignment between all of these lasers becomes problematic and a low cost solution for this alignment becomes a necessity.

By controlling the light beams output from the beamers such that these are out of phase, the laser beams do not hit one point of the rear projection screen at the same time which provides a higher safety. Simultaneously, the out of phase scanning of all laser beamers provides a method to implement a low cost auto alignment solution.

Controlling the beamers such that the light beams generated from the beamers are out of phase can, according to embodiments, comprise controlling the beamers such that the light beams generated from the beamers hit the projection screen at different positions at a certain time.

For example, in case each of the beamers creates one separate view in a certain viewing direction, the luminous flux of the light emitted from each of the beamers can be limited to less than 100 lumen, preferably less than 40 lumen. Each viewing direction is characterized in emitting light within a limited viewing cone. The luminous flux of the beamers suffices to create a view with enough brightness within the viewing cone. Each beamer may therefore account for one view within a multi-view display with enough brightness. In case a large number of laser beamers is used, this reduces the lumen requirement of each laser beamer. This may increase the technical feasibility to produce adequate beamers for this application.

Since the lasers will have the longest lifetime at lower power consumptions, the power for each beamer can be relatively low. In case of 40 lumen for each beamer, the output of each beamer will be approximately 200 mW. Assuming even a poor efficiency of such beamer of e.g. 5%, it will need 4 W electrical input. In case of a 9 view system this would result into 9*4=36 W power compared to the 560 W as indicated above for beamers using a gas discharge lamp.

Further, the switcheable diffuser can be polarizing dependent. According to embodiments, a first and a second polarizing direction can be present in the diffuser. In a first polarizing direction, the diffuser may be transparent and in a second polarizing direction, the diffuser may be in a diffusing state. Each light beam from any one of the beamers can be polarized in one of these directions and projected onto the diffuser. For polarizing the beams of light, each beam can be directed through a polarizing element being part of the switcheable diffuser, but being arranged in the path of the beams of light. The polarizing element is the element which is switcheable and can be switched between the first and the second polarizing direction. For example, when creating a single view 2D display, light emitting from each of the beamers is polarized in the second polarizing direction. Because the diffuser is in a diffusing state for light in the second polarizing direction, the light is scattered and a 2D view is provided. In contrast, if light is polarized in the first polarizing direction, the diffuser is transparent for the light and a 3D multi-view display is provided, where each beamer contributes to one viewing direction. The polarization direction of the light beams may be rotated using optical active LC elements, preferably electro-optical active LC elements.

The projection screen may, according to embodiments, further comprise at least one lenticular screen and/or at least one Fresnel lens. The lens structures in the lenticular lens and/or the Fresnel lens images the light originated from the individual laser beamers towards the wished viewing directions.

When operated as a 3D multi-view display, each of the beamers emits light via the lenticular and/or Fresnel lens structures in a certain viewing direction. Therefore, the maximum luminous flux of 100 lumen, preferably less than 40 lumen, is sufficient within each of the viewing directions, as the viewing cone is limited. For single view 2D projection, the luminous flux of the beamers cumulates to an overall luminous flux on the projection screen. The luminous flux of all beamers should be around 400 lumen. For example, when N beamers are provided, each beamer should have a luminous flux of approximately 400/N lumen.

According to embodiments, the beamers can alternatively be microbeamers, which can be assembled around microdisplays with extremely small lighting panels, for examples less than 0,1". Preferably, the used light sources are laser lightsources, but also LED light sources might be used for these type of microbeamers.

In order to control the light emitted from the beamers, in particular from the scanning laser beamers, embodiments provide arranging at least one sensor at the outer edge of the projection screen. The sensor may be arranged to sense the light directly, or the light being reflected from an overscan area. The sensor may be arranged to sense at least the phase of the light beams generated from the respective beamers, and/or the luminous flux of light beams generated from the beamers, and/or the color coordinates of light beams generated from the beamers.

Each beamer will need to generate an overscan on the rear projection screen. Observing the overscan area just outside the rear projection screen, and viewed from the projectors side of the housing by sensors, e.g. a cameras, provides information regarding the timing, i.e. when each laser beam hits certain spots on the projection screen and preferably on the overscan area. This information provides the exact phase differences between the beamers. The output signal of such camera can be used to automatically align all laser beamers towards the rear projection screen.

The sensor is, according to embodiments, coupled to the control device in order to control the light emitted from the beamers depending on the sensed values.

A further aspect of the application is a rear projecting method for creating at least one view of a scene with projecting at least one view of a scene into at least one viewing direction onto a rear side of a projection screen with at least two light beams; and switching at least one switchable diffuser between a transparent state and a diffuse state, wherein in the transparent state different view of a scene are generated, and wherein in the diffuse state one view of a scene is generated.

According to an embodiment, which itself has inventive character and can be independent of the solution mentioned above, there is provided a rear projecting method for creating at least one view of a scene with projecting at least one view of a scene into at least one viewing direction onto a rear side of a projection screen further comprising generating one view of a scene into at least one viewing direction and projecting the view onto the rear side of the projection screen by scanning the projection screen with scanning laser light beams and controlling the light beams such that the light beams are out of phase.

These and other aspects of the application will be come apparent from and elucidated with reference to the following Figures.

Figure 2:
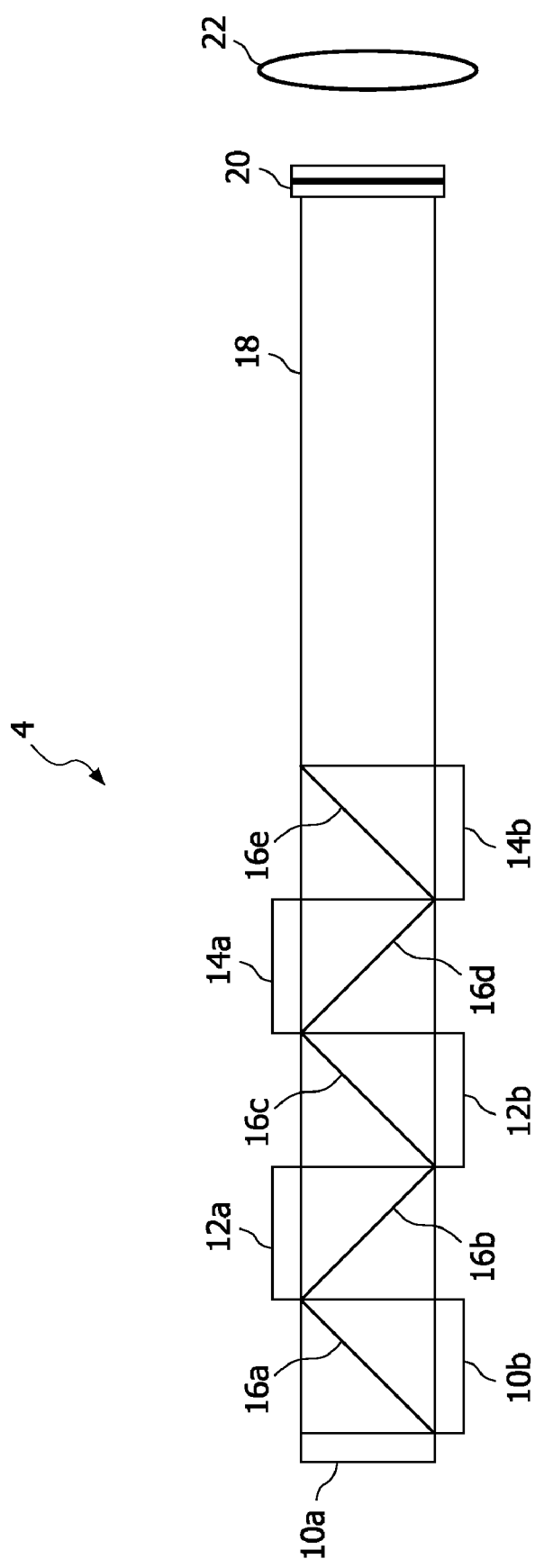
Figure 3:
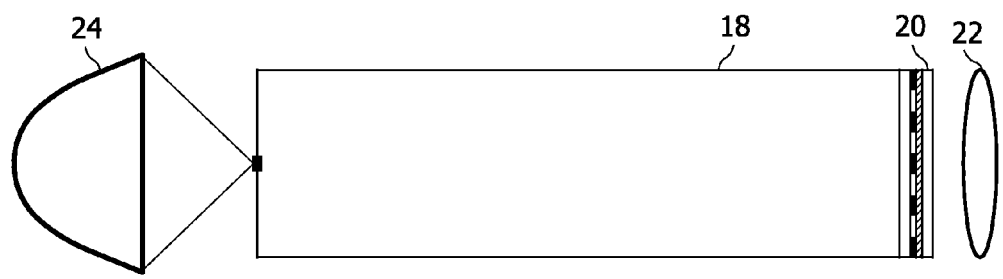
Figure 4:
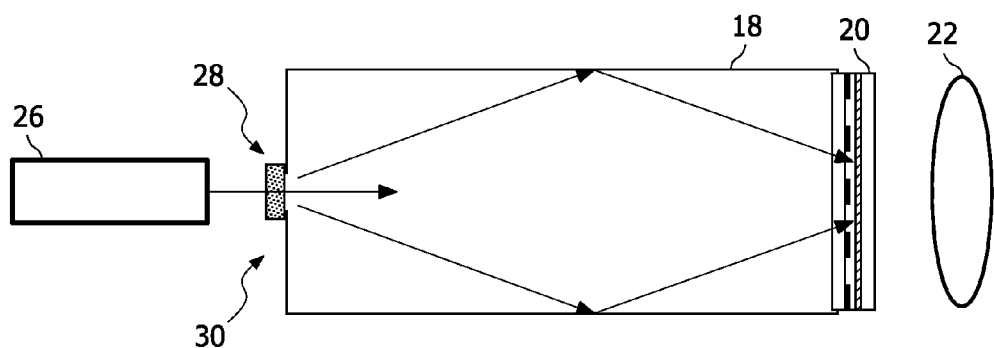
Figure 5:
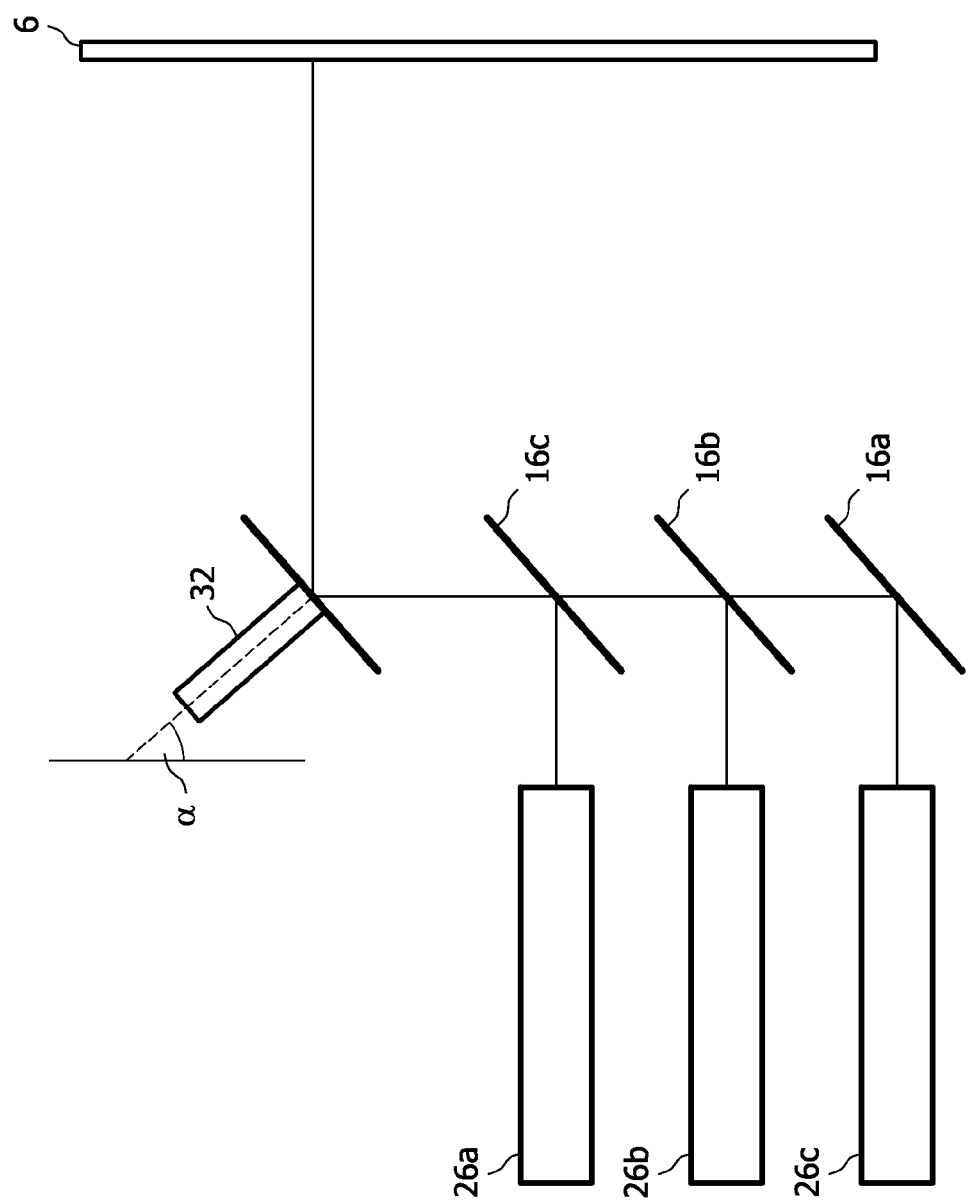
Figure 6:
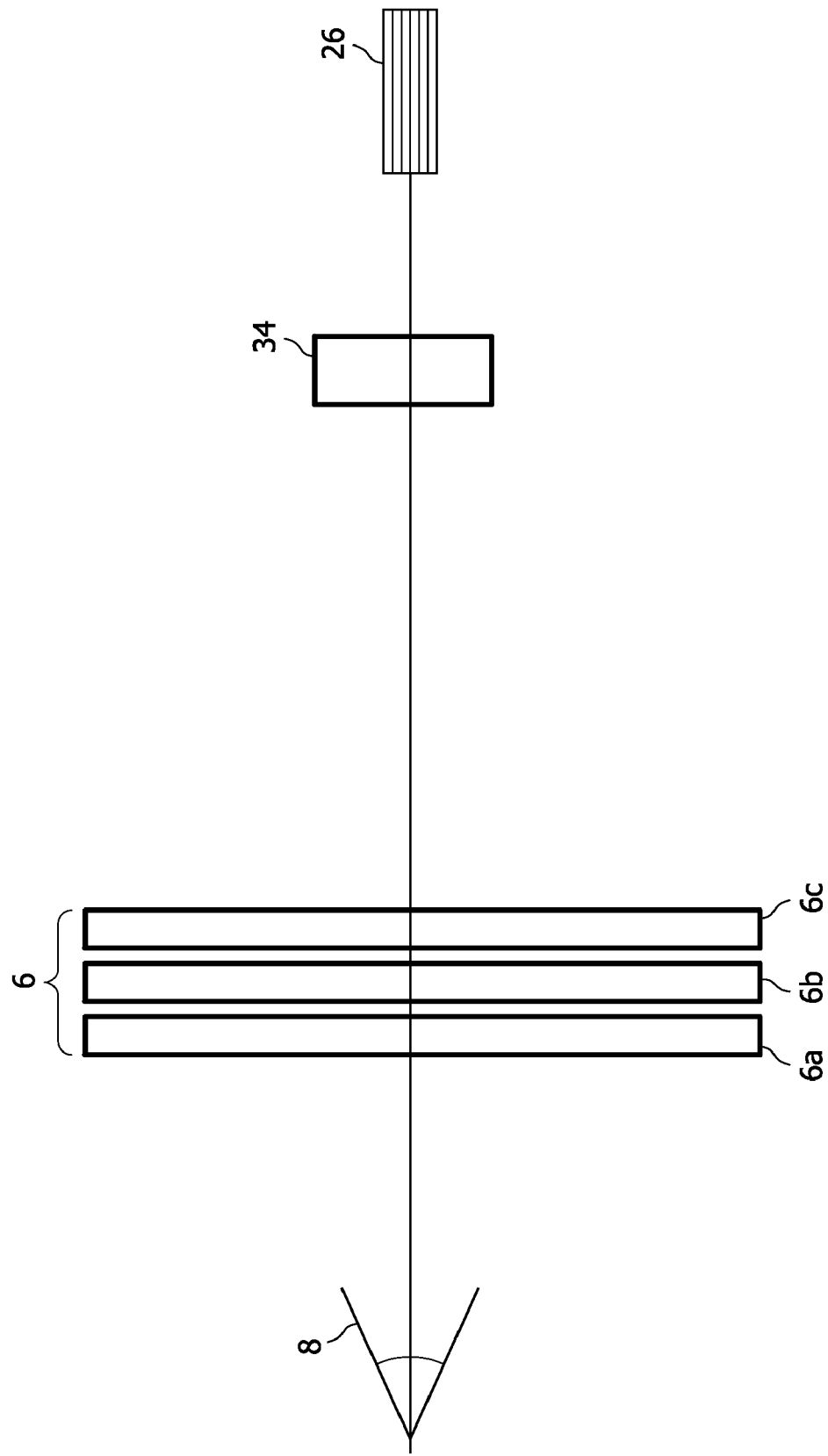
Figure 7:
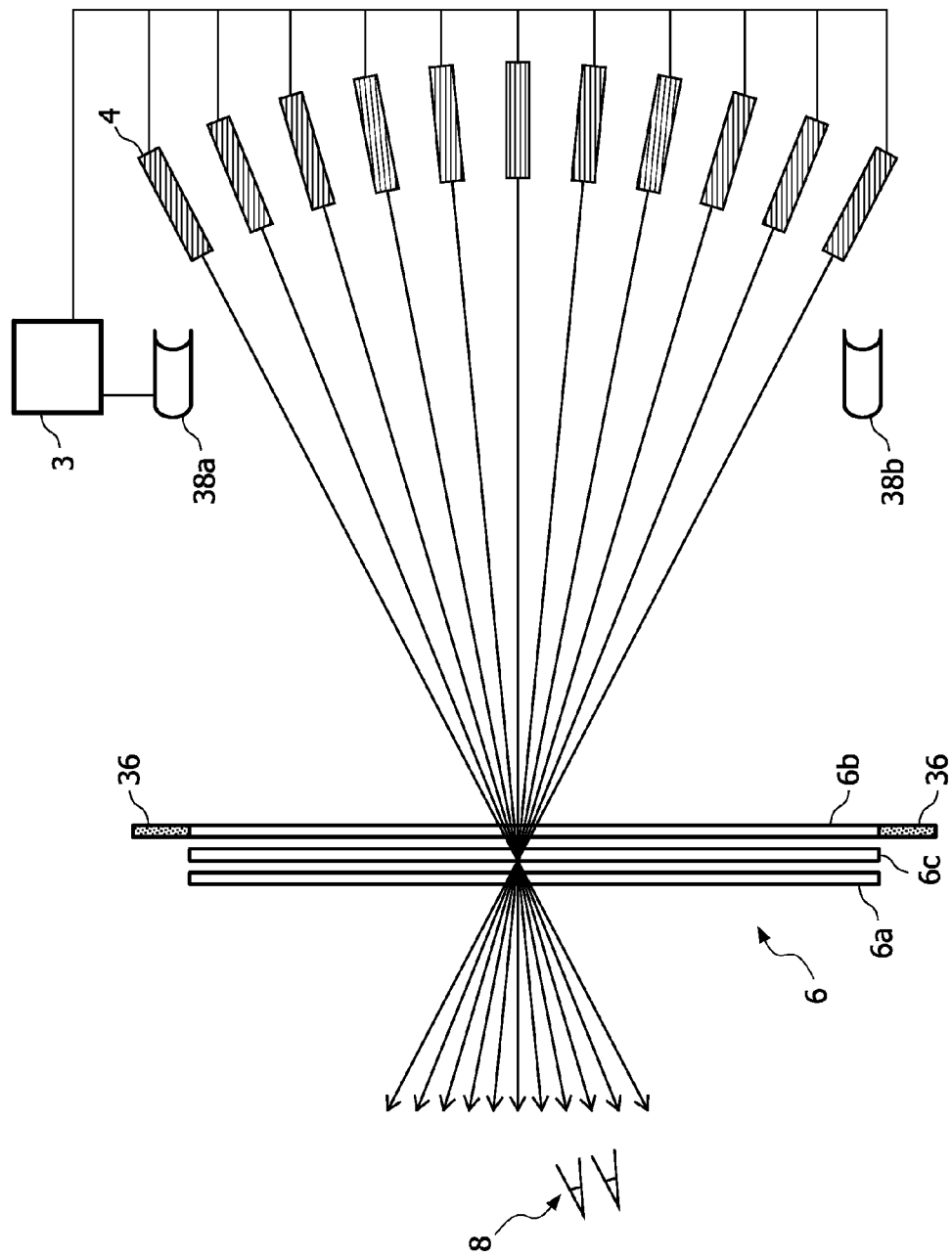

In the Figures show:

FIG. 1 one possible arrangement of a multi-view rear projector;

FIG. 2 an embodiment of a microbeamer using a microdisplay and light emitting diodes;

FIG. 3 a further embodiment of a microbeamer;

FIG. 4 an embodiment of a microbeamer using a microdisplay and laser lightsources;

FIG. 5 an embodiment of a scanning laser beamer arranged within a rear projector;

FIG. 6 an embodiment of a rear projector comprising a polarizing dependent diffuser;

FIG. 7 a further embodiment of a rear projector.

FIG. 1 illustrates a rear projector 2 according to a preferred embodiment. The rear projector 2, as illustrated in FIG. 1 provides a large number of views for 3D imaging. Each viewing direction is provided with a high resolution image. The rear projector 2 as illustrated in FIG. 1 is affordable and scaleable, i.e., the number of views depends on the number of beamers 4. The beamers 4 can be scanning laser microbeamers with relatively low brightness, or microbeamers with LED light sources or laser light sources and microdisplays. The rear projector 2 comprises a projection screen 6, which can be switcheable between 2D and 3D mode. In 2D mode, the rear projection screen 6 is in a diffuse state and in 3D mode the rear projection screen 6 is transparent. In 2D mode, the rear projector 2 provides a super high resolution view, because each beamer contributes to the overall resolution of the projected view. In 3D mode, an observer 8 sees at his viewing position two different views of a scene, i.e. one view for each eye, whereby a 3D impression is created. In 2D mode, the beamers 4 scan their beams of light over the projection screen 6. By scanning the projection screen, each beamer 4 emits its light onto the whole surface of the projection screen 6 within a certain time interval, for example similar to an electron ray in a CRT.

Each of the beamers 4 is controlled by a control device 3. The control device 3 controls the timing when the beam of light emitting from the beamers 4 hits a certain position on the projection screen 6.

The control device is arranged such that the beams of light emitting from the beamers 4 do not hit the projection screen 6 at the same time at the same spot, which increases the safety aspects of the laser beams being incident into a human eye caused by any damage of the projection screen.

FIG. 5 illustrates an arrangement for scanning laser beams over the projection screen 6. Illustrated are lasers 26, of which laser 26a emits blue light, laser 26b emits green light, and laser 26c emits red light. The light beams emitting from lasers 26 are directed onto mirrors 16. Mirror 16b, and mirror 16c both are dichroic mirrors. Thus, the mirrors 16b, 16c are transmissive for certain colors and reflective for others. For example, mirror 16b may be reflective for green color and transmissive for any other color. Further, mirror 16c may be reflective for blue color and transmissive for any other color. The added laser beams from the lasers 26 hit a scan mirror 32. Scan mirror 32 reflects the beam of light onto projection screen 6. By changing the angle α, projection mirror 32 can sweep the beam of light along a horizontal line on the projection screen 6. Further, by changing a pivoting angle of scan mirror 32 relative to the drawing plane, the vertical position of the beam of light can be changed. Thus, by changing both of the angles of scan mirror 32, the whole surface of the projection screen 6 can be scanned with the beam of light. Each beamer 4 can have a scan mirror 32. A control device can control the scan mirrors 32 of each of the beamers 4 in order to generate phase differences of the laser beams. Further, the intensity of the lasers 26 can be manipulated by a control device to control the color and intensity of the beam of light.

Alternatively the beamers 4 can be microdisplay based microbeamers, as will be illustrated in more detail with reference to FIGS. 2-4.

FIG. 2 illustrates a microbeamer 4 comprising light emitting diodes (LED) 10, 12, 14 as light emitting elements. Further comprised are dichroic mirrors 16a-e, a light integrator 18, a miniaturized liquid crystal display (LCD) 20, which can be considered as microdisplay, and a projection lens 22.

Red light is emitted from LEDs 10a, 10b, where LED's 10a and 10b emit light of a slightly different range of wavelengths. The light emitted from LED 10b is reflected towards the microdisplay by dichroic mirror 16a, while the light from LED 10a is transmitted by dichroic mirror 16a towards the microdisplay. Green light is emitted from LEDs 12a, 12b, where LED's 12a and 12b emit light of a slightly different range of wavelengths. Light emitted from LED 12a is reflected towards the microdisplay by dichroic mirror 16b, and light emitted from LED 12b is reflected to the microdisplay by dichroic mirror 16c. LEDs 14a, 14b emit blue light, where LED's 14a and 14b emit light of a slightly different range of wavelengths. Light emitted from LED 14a is reflected towards the microdisplay by dichroic mirror 16d, and light emitted from LED 14b is reflected towards the microdisplay by dichroic mirror 16e. By having arranged the mirrors 16, as illustrated, light emitted from any of the LED 10, 12, 14 is directed towards the microdisplay and enters into integrator 18. Each LED 10-14 contributes to the overall light beam with a certain color. The sum of light emitted from the LEDs 10-14 results in the beam of light emitted from the microbeamer 4.

Integrator 18 can be comprised of a transparent material. The integrator 18 can have a rectangular cross section with the same aspect ratio as the microdisplay. The integrator can have light reflective walls except for the entrance surface (the surface where the light originated from the LEDs 10-14 enters the integrator 18) and the exit surface (the surface where the light leaves the integrator 18 towards the microdisplay). As such, the integrator 18 might consist of four plates of which each carries a mirror layer and which are mounted together to form a hollow rectangular tunnel. The integrator 18 may also be a rectangular bar of optical transparent material having a high refractive index (e.g. glass), such that the rays of light reflect at the walls of the integrator 18 by total internal reflection.

Within integrator 18, the light emitted from the LEDs 10-14 is integrated, i.e. mixed and redistributed such that it obtains a homogeneous light distribution at the exit surface, and provided onto LCD 20. The image information for a corresponding view is electronically addressed into the LCD 20, where the homogeneous light distribution that illuminates the LCD 20 is modified into a visible 2D image. The projection lens 20 is projecting a 2D magnified image of the LCD 20 onto the projection screen. By using LEDs 10-14, a beam of light can be created using little energy. Further, the lifetime of an LED is very long.

FIG. 3 illustrates another microbeamer 4, which is comprised of a projection lamp 24, an integrator 18, an LCD 20, and a projection lens 22. Projection lamp 24 provides white light, which light is guided through integrator 18 to illuminate the microdisplay LCD 20. The image information for a corresponding view is electronically addressed into the LCD 20, where the homogeneous light distribution that illuminates the LCD 20 is modified into a visible 2D image. The projection lens 20 is projecting a magnified 2D image of the LCD 20 onto the projection screen.

FIG. 4 illustrates a further microbeamer 4 with a laser 26, a diffuser 28, an integrator 18 with a mirrored case 30, a microdisplay LCD 20, and a projection lens 22. Light emitted from the laser 26 is scattered within diffuser 28, such that the beams of light are directed in all direction within mirrored case 30. Through the use of mirrors on the inside of the integrator 18, light is guided through the integrator, and hits the LCD panel with a homogeneous light distribution.

The image information for a corresponding view is electronically addressed into the LCD 20, where the homogeneous light distribution that illuminates the LCD 20 is modified into a visible image. The projection lens 20 is projecting a magnified 2D image of the LCD 20 onto the projection screen. Since this particular embodiment makes use of laser light sources, the light beam leaving the integrator 18 can have a very small cross section, while the angular distribution of the light is still rather small, such that a small diameter projection lens 22 can be used. This enables the use of very small microdisplays 20 (preferably <0.1"). Typically, only a small amount of light is transmitted by the microdisplay 20 while a large amount of light is reflected at the electrodes within the microdisplay 20. At constant resolution, smaller microdisplay's 20 will have smaller geometrical openings, meaning that a larger amount of light is reflected at these electrodes. The embodiment in FIG. 4 recycles however most of the light reflected at the microdisplay's in a very efficient way. At the diffuser 28 a mirror can be positioned having a hole in the center to allow the light originating from the laser to enter the integrator 18. Since the laser beam is having a very small cross section, the hole in mirror 30 is small and most of the light reflected back from the microdisplay 20 will hit the mirror-surface 30 and re-illuminates the microdisplay 20.

FIG. 6 illustrates a further arrangement of a rear projector comprising a laser 26, an LCD element 34, and a projection screen 6. The beam of light projecting from laser 26 is polarized. The LCD element 34 can be used to rotate this polarization direction. The LCD element can be considered part of a switcheable diffuser. Either the diffuser is switcheable itself, or it can be polarizing dependent, and the switcheability is within the polarizing element, which can be the LCD element 34. For example, it is possible to polarize the light into two different polarizing directions being orthogonal to each other. The polarized light may hit the projection screen 6, which is comprised on a lenticular sheet 6a, a polarization depended diffuser 6b, and a Fresnel lens 6c. The polarization dependent diffuser 6b may be arranged such that it is transparent for light within a horizontal polarization direction, and diffuse for light in a vertical polarization direction. By switching the polarization directions within LCD element 34, it can be decided, whether light emitting from laser 26 is diffused in polarization dependent diffuser 6b, or not. Thus, it can be possible to switch between a 2D mode and a 3D mode.

For example, when having multiple lasers 26, each laser 26 is projection light in a different viewing direction, as illustrated in FIG. 1, and a 3D display can be provided. In this case, the LCD element 34, which may be arranged in front of each of laser 26, adjusts a polarization direction of the beams of light, such that they pass through the polarization dependent diffuser 6b, and an observer 8 has a 3D impression. Else, in case a 2D view shall be created, the polarization direction of the beams of light can be changed, such that they are diffused in polarization dependent diffuser 6b. Then, all lasers contribute to one single image.

FIG. 7 illustrates an arrangement, where the projection elements 4 are controlled depending on sensor information. In this embodiment, the diffuser 6b may have an overscan area 36. Further, the diffuser 6b can be switcheable, such that its state may be changed between a diffuse state and a transparent state. Further, at least two sensors 38 are provided. These sensors 38 can be arranged at the overscan area 36. It may be possible that the sensors are arranged such that they detect light reflected from an overscan area 36, or that the sensors 38 are arranged within the overscan area 36 itself. The beams of light emitted from the scanning laser beamers 4 sweep over the projection screen 6. In case of multi-view operation, the switcheable diffuser 6b is in its transparent state. The beams of light scan the projection screen 6 by sweeping over it. The scanning area is arranged such that it extents onto the overscan area 36. When one beam hits the edge of the screen 6, i.e. the overscan area 36, the sensor 38 detects the individual laser beams. The sensors 38 might measure the color and brightness level of the laser beams, and such the control device 3 may adjust the drive signals of the beamers 4 in order to minimize color and intensity variations over the screen. In case of laser beamers 4, the beams of light may be swept over the projection screen 6 in a synchronized fashion, but with a phase difference, such that the sensors 38 sense the different laser beamers independently over time. These phase differences increase the safety aspects of the used laser beams.

In case of a 2D mode, where the switcheable diffuser 6b is in its diffuse state, each beam of light contributes to one single view. Again, the sensors 38 may detect intensity, color, and phase of the beams of light of each of the beamer individually within the overscan area 36, and may provide control information for control device 4 in order to adjust the phase, the position, the intensity, and the color of each of the beamers 4.

The system according to the application can be used within 3D television, 3D computer monitors, 3D CAD/CAM systems, 3D advertisements boards, ultra high resolution 2D displays, and switcheable displays. The brightness requirements for each of the beamers 4 are reduced, when the number of beamers 4 is increased.

It is alternatively possible to make the rear projection system modular. The user can start with a projection system containing only 5 microbeamers and can later upgrade his system by adding extra beamers to the system and such increases the number of available views.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. It should also be recognized that any reference signs shall not be constructed as limiting the scope of the claims.

The invention claimed is:

1. Rear projector, comprising:
    at least one projection screen,
    at least two beamers, each of the at least two beamers generating one view of a scene into at least one viewing direction and projecting the view onto the rear side of the projection screen,
    at least one switcheable diffuser, which is switcheable between a transparent state and a diffuse state, wherein in the transparent state each beamer generates a different view of the scene, and wherein in the diffuse state the beamers generate one view of the scene; and
    at least one control device for controlling the at least two beamers such that light beams generated by the at least two beamers are out of phase.

2. Rear projector of claim 1, wherein the at least two beamers are scanning laser beamers, each of the at least two beamers generating one view of a scene into at least one viewing direction and projecting the view onto the rear side of the projection screen by scanning the projection screen with a light beam.

3. The rear projector of claim 2, wherein the control device is arranged to control the beamers such that the light beams generated from the beamers hit the projection screen at different positions at a certain time.

4. The rear projector of claim 1, wherein the switcheable diffuser comprises a polarizing dependent diffuser which is transparent for a first polarizing direction and which is diffuse for a second polarizing direction and further at least one polarizing element for polarizing the beams of light projected onto the diffuser which is switcheable between a first polarizing direction and a second polarizing direction.

5. The rear projector of claim 1, wherein the projection screen comprises at least one of a lenticular screen and a Fresnel lens.

6. The rear projector of claim 1, wherein each beamer has a maximum luminous flux of 100 lumen, preferable less than 40 lumen.

7. The rear projector of claim 1, wherein at least 9 beamers are arranged behind the projection screen such that at least 9 different views of a scene are generated.

8. The rear projector of claim 1, wherein the beamers contain a microdisplay and an LED light source.

9. The rear projector of claim 1, further comprising at least one sensor arranged at the outer edge of the projection screen and arranged to sense at least one of the values:
    the phase of light beams generated from the beamers;
    the luminous flux of light beams generated from the beamers;
    the color coordinates of light beams generated from the beamers.

10. The rear projector of claim 9, further comprising coupling at least one sensor with the control device to control the light emitted from the beamers depending on the sensed values.

11. A rear projecting method for creating at least one view of a scene, comprising:
    projecting at least one view of a scene into at least one viewing direction onto a rear side of a projection screen with at least two light beams;
    switching at least one switcheable diffuser between a transparent state and a diffuse state, wherein in the transparent state different view of the scene are generated, and wherein in the diffuse state one view of the scene is generated; and
    controlling the light beams such that the light beams are out of phase.

12. The method of claim 11, further comprising generating one view of the scene into at least one viewing direction and projecting the view onto the rear side of the projection screen by scanning the projection screen with scanning laser light beams.

13. The method of claim 12, further comprising controlling the light beams such that the light beams hit the projection screen at different positions at a certain time.

* * * * *